United States Patent
Li et al.

(10) Patent No.: US 11,036,855 B2
(45) Date of Patent: Jun. 15, 2021

(54) DETECTING FRAME INJECTION THROUGH WEB PAGE ANALYSIS

(71) Applicant: EMC IP Holding Company LLC, Hopkinton, MA (US)

(72) Inventors: Zhou Li, Malden, MA (US); Kevin Bowers, Melrose, MA (US); Martin Rosa, Quebec (CA); Raymond Carney, North Franklin, CT (US); Ke Tian, Redmond, WA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 383 days.

(21) Appl. No.: 16/146,587

(22) Filed: Sep. 28, 2018

(65) Prior Publication Data

US 2020/0104488 A1    Apr. 2, 2020

(51) Int. Cl.
| | |
|---|---|
| *H04L 29/06* | (2006.01) |
| *G06F 21/56* | (2013.01) |
| *G06F 16/951* | (2019.01) |
| *G06F 16/955* | (2019.01) |
| *G06F 40/221* | (2020.01) |

(52) U.S. Cl.
CPC ............ *G06F 21/56* (2013.01); *G06F 16/951* (2019.01); *G06F 16/9566* (2019.01); *G06F 40/221* (2020.01); *G06F 2221/2119* (2013.01)

(58) Field of Classification Search
CPC .................. G06F 21/56; G06F 21/128; G06F 2221/2119; G06F 16/9566; G06F 16/951; G06F 40/221; H04L 63/145
See application file for complete search history.

(56) References Cited

U.S. PATENT DOCUMENTS

| | | | | |
|---|---|---|---|---|
| 8,108,245 B1* | 1/2012 | Hosea | ................ | G06Q 30/0204 705/7.33 |
| 8,505,094 B1* | 8/2013 | Xuewen | .............. | H04L 63/1416 726/22 |

(Continued)

OTHER PUBLICATIONS

Trevor Jim et al., Defeating Script Injection Attacks with Browser-Enforced Embedded Policies, May 2007, ACM, pp. 601-610. (Year: 2007).*

(Continued)

*Primary Examiner* — Luu T Pham
*Assistant Examiner* — Fahimeh Mohammadi
(74) *Attorney, Agent, or Firm* — Ryan, Mason & Lewis, LLP

(57) ABSTRACT

A method includes obtaining a given web page, parsing the given web page to identify one or more frame tags for one or more inline frames of the given web page, and extracting a set of features of a given inline frame from a given one of the identified frame tags in the given web page, the extracted set of features comprising one or more style features, one or more destination features and one or more context features of the given identified frame tag. The method also includes classifying the given inline frame as one of a malicious frame type and a benign frame type utilizing at least one model and at least a portion of the extracted set of features, and controlling access by one or more client devices associated with an enterprise to the given web page responsive to classifying the given inline frame as the malicious frame type.

20 Claims, 13 Drawing Sheets

(56) References Cited

U.S. PATENT DOCUMENTS

| | | | | |
|---|---|---|---|---|
| 8,516,590 | B1* | 8/2013 | Ranadive | H04L 63/1483 726/24 |
| 8,555,391 | B1* | 10/2013 | Demir | H04L 67/02 726/24 |
| 9,292,691 | B1* | 3/2016 | Hittel | G06F 21/563 |
| 9,298,919 | B1* | 3/2016 | Demir | H04L 67/02 |
| 9,436,953 | B1* | 9/2016 | Bonzi | G06F 16/9535 |
| 10,104,113 | B1* | 10/2018 | Stein | H04L 63/1433 |
| 2010/0100958 | A1* | 4/2010 | Jeremiah | G06F 21/36 726/22 |
| 2012/0158626 | A1* | 6/2012 | Zhu | H04L 63/1408 706/13 |
| 2013/0007882 | A1* | 1/2013 | Devarajan | H04L 63/1416 726/24 |
| 2013/0262978 | A1* | 10/2013 | Reshadi | G06F 40/221 715/234 |
| 2014/0041023 | A1* | 2/2014 | Lekies | H04L 63/1466 726/22 |
| 2015/0032753 | A1* | 1/2015 | Yang | G06F 16/353 707/738 |
| 2015/0106725 | A1* | 4/2015 | Kamdar | H04L 61/3025 715/739 |
| 2016/0277259 | A1* | 9/2016 | Qi | H04L 43/045 |
| 2018/0091546 | A1* | 3/2018 | Davidson | G06F 40/14 |

OTHER PUBLICATIONS

Xing Jin et al., code injection attacks on html5-based mobile apps characterization detection and mitigation, Nov. 2014, ACM, pp. 66-77. (Year: 2014).*

Zhou Li et al., Hunting the Red Fox Online: Understanding and Detection of Mass Redirect-Script Injections, May 18-21, 2014, IEEE, pp. 3-18. (Year: 2014).*

Christian Seifert et al., Identification of Malicious Web Pages with Static Heuristics, Dec. 7-10, 2008, IEEE, pp. 91-96. (Year: 2008).*

RSA, "Shadowfall," https://www.rsa.com/en-us/blog/2017-06/shadowfall, Jun. 5, 2017, 27 pages.

"Scrapy—A Fast and Powerful Scraping and Web Crawling Framework," https://scrapy.org/, Sep. 28, 2018, 2 pages.

Leonard Richardson, "Beautiful Soup: We called him Tortoise because he taught us," https://scrapy.org/, Aug. 12, 2018, 2 pages.

"AWS—Alexa Top Sites—Up-to-date Lists of the Top Sites on the Web," https://aws.amazon.com/alexa-top-sites/, Sep. 28, 2018, 3 pages.

"EasyList—Overview," https://easylist.to/, Sep. 28, 2018, 2 pages.

FireEye, "FireEye Network Security," 2018, 12 pages.

Barracuda, "Barracuda Web Application Firewall," 2018, 2 pages.

L. Breiman et al., "Random Forests," https://www.stat.berkeley.edu/~breiman/RandomForests/cc_home.htm, 2017, 24 pages.

A. Ntoulas et al., "Detecting Spam Web Pages Through Content Analysis," Proceedings of the 15th International Conference on World Wide Web (WWW), May 23-26, 2006, 10 pages.

C. Whittaker et al., "Large-Scale Automatic Classification of Phishing Pages," Proceedings of the Annual Network and Distributed System Security Symposium (NDSS), 2010, 14 pages.

K. Thomas et al., "Design and Evaluation of a Real-Time URL Spam Filtering Service," Proceedings of the IEEE Symposium on Security and Privacy (S&P), 2011, 16 pages.

D. Canali et al., "Prophiler: A Fast Filter for the Large-Scale Detection of Malicious Web Pages," Proceedings of the 20th International Conference on World Wide Web (WWW), Mar. 28-Apr. 1, 2011, 10 pages.

J. Ma et al., "Beyond Blacklists: Learning to Detect Malicious Web Sites from Suspicious URLs," Proceedings of the 15th ACM SIGKDD International Conference on Knowledge Discovery and Data Mining (KDD), Jun. 28-Jul. 1, 2009, 9 pages.

M. Felegyhazi et al., "On the Potential of Proactive Domain Blacklisting," Proceedings of the USENIX Conference on Large-scale Exploits and Emergent Threats: Botnets, Spyware, Worms, and More (LEET), 2010, 8 pages.

J. Ma et al., "Identifying Suspicious URLs: An Application of Large-Scale Online Learning," Proceedings of the 26th Annual International Conference on Machine Learning (ICML), 2009, 8 pages.

Z. Li et al., "Hunting the Red Fox Online: Understanding and Detection of Mass Redirect-Script Injections," IEEE Symposium on Security and Privacy (S&P), 2014, 16 pages.

K. Borgolte et al., "Delta: Automatic Identification of Unknown Web-Based Infection Campaigns," Proceedings of the 2013 ACM SIGSAC Conference on Computer & Communications Security (CCS), Nov. 4-8, 2013, 12 pages.

O. Catakoglu et al., "Automatic Extraction of Indicators of Compromise for Web Applications," Proceedings of the 25th International Conference on World Wide Web (WWW), Apr. 11-15, 2016, 11 pages.

* cited by examiner

FIG. 3

| Category | ID | Name | Description | Type |
|---|---|---|---|---|
| Style (7) | 1 | h_width_min | Minimum width value | Integer/None |
| | 2 | h_vis_attr | Visibility value | Binary |
| | 3 | h_top_atr | Maximum absolute top value | Integer/None |
| | 4 | h_left_attr | Maximum absolute left value | Integer/None |
| | 5 | h_height_min | Minimum height value | Integer/None |
| | 6 | h_dis_attr | Display value | Binary |
| | 7 | h_is_tag_hidden | True if any of features (1)-(6) are true or over a designated threshold | Binary |

FIG. 5A

| Category | ID | Name | Description | Type |
|---|---|---|---|---|
| Destination (16) | 8 | s_has_subdomain | Whether an iframe src has subdomain | Binary |
| | 9 | s_path_len | The length of URL path | Integer |
| | 10 | s_has_fragment | Whether the URL has fragments | Binary |
| | 11 | s_has_file_name_extension | Whether an iframe has file name | Binary |
| | 12 | s_src_len | The length of the whole URL | Integer |
| | 13 | s_src_len_sub | The length of the subdomain | Integer |
| | 14 | s_isword_sub | Whether subdomain is an English word | Binary |
| | 15 | s_has_digit_sub | Whether subdomain has a number or digit | Binary |
| | 16 | s_count_of_digits_webname | The number of digits in the whole URL | Integer |
| | 17 | s_count_of_letters_webname | The count of letters in the whole URL | Integer |
| | 18 | s_count_of_digits_sub | The count of digits in the subdomain | Integer |
| | 19 | s_count_of_letters_sub | The count of letters in the subdomain | Integer |
| | 20 | s_src_len_query | The length of query string in the URL | Integer |
| | 21 | s_num_of_dots | The number of dots in src | Integer |
| | 22 | s_cate_TLD | Category of top level domain (TLD) | String |
| | 23 | s_query_rg_num | Number of arguments in the query | Integer |

| Category | ID | Name | Description | Type |
|---|---|---|---|---|
| Context (23) | 24 | t_in_the_html | Whether the iframe is a descendent to HTML tag | Binary |
| | 25 | t_in_the_body | Whether the iframe is a descendent to BODY tag | Binary |
| | 26 | t_in_the_head | Whether the iframe is a descendent to HEAD tag | Binary |
| | 27 | i_total_length_page | The number of lines of the web page | Integer |
| | 28 | t_distance_to_body | The number of levels to the BODY tag if within | Integer/None |
| | 29 | t_distance_to_html | The number of levels to the HTML tag if within | Integer/None |
| | 30 | t_distance_to_head | The number of levels to the HEAD tag if within | Integer/None |
| | 31 | t_distance_to_root | The number of levels to the document root | Integer |
| | 32 | l_abs_iframe | The absolute line number of an iframe in document | Integer |
| | 33 | l_rela_iframe | The ratio of L_abs_iframe to l_total_length_page | Float |
| | 34 | l_abs_dis_iframe_body | The difference of line number between iframe and a BODY tag | Integer |
| | 35 | i_rela_dis_iframe_body | The ratio of L_abs_dis_iframe_body to l_total_length_page | Float |

FIG. 5C

| Category | ID | Name | Description | Type |
|---|---|---|---|---|
| | 36 | l_abs_dis_iframe_html | The difference of line number between iframe and a HTML tag | Integer |
| | 37 | l_rela_dis_iframe_html | The ratio of L_abs_dis_iframe_html to l_total_length_page | Float |
| | 38 | l_abs_minimum_dis | The minimum of L_abs_dis_iframe_html and L_abs_dis_iframe_body | Integer |
| | 39 | l_ratio_minimum_dis | The ratio of L_abs_minimum_dis to l_total_length_page | Float |
| Context (23) | 40 | b_content_type | The site template used in the website | String/None |
| | 41 | b_number_of_iframe | The total number of iframes in this HTML page | Integer |
| | 42 | b_presence_of_double_body | The presence of multiple BODY tags | Binary |
| | 43 | b_presence_of_double_html | The presence of multiple HTML tags | Binary |
| | 44 | b_presence_of_double_head | The presence of multiple HEAD tags | Binary |
| | 45 | c_is_src_external | Whether the URL is external | Binary |
| | 46 | c_number_domain_src | Times the URL domain appears in all iframe src | Integer |

FIG. 5D

DETECTING FRAME INJECTION THROUGH WEB PAGE ANALYSIS

FIELD

The field relates generally to information security, and more particularly to detection of security threats in computer networks.

BACKGROUND

Various entities are subject to different types of security threats. Some security threats relate to networking and computer security for client devices used by members of an entity, such as a business, organization or other enterprise. Security threats of this type include malware and potentially unwanted programs (PUPs) such as adware. Malware and PUPs can pose a threat to an individual user and that user's devices, as well as possibly threatening an entity associated with the user. Users or members of an entity can become victims of malware-based attacks through a variety of different infection vectors including but not limited to visiting suspicious web sites, connecting machines or devices to untrusted networks, using infected universal serial bus (USB) drives, etc.

SUMMARY

Illustrative embodiments of the present invention provide techniques for detecting frame injection through web page analysis.

In one embodiment, a method comprises obtaining a given web page, parsing the given web page to identify one or more frame tags for one or more inline frames of the given web page, and extracting a set of features of a given inline frame from a given one of the identified frame tags in the given web page, the extracted set of features comprising one or more style features, one or more destination features and one or more context features of the given identified frame tag. The method also classifying the given inline frame as one of a malicious frame type and a benign frame type utilizing at least one model and at least a portion of the extracted set of features, and controlling access by one or more client devices associated with an enterprise to the given web page responsive to classifying the given inline frame as the malicious frame type. The method is performed by at least one processing device comprising a processor coupled to a memory.

The processing device may be implemented, for example, in one or more network devices in a computer network, in a security operations center of an enterprise, or in a security analytics system or other type of network security system associated with the computer network or an enterprise.

These and other illustrative embodiments include, without limitation, methods, apparatus, networks, systems and processor-readable storage media.

BRIEF DESCRIPTION OF THE DRAWINGS

FIG. 3 shows an example of frame injection in an illustrative embodiment.

FIGS. 5A-5D show a table of example frame features in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
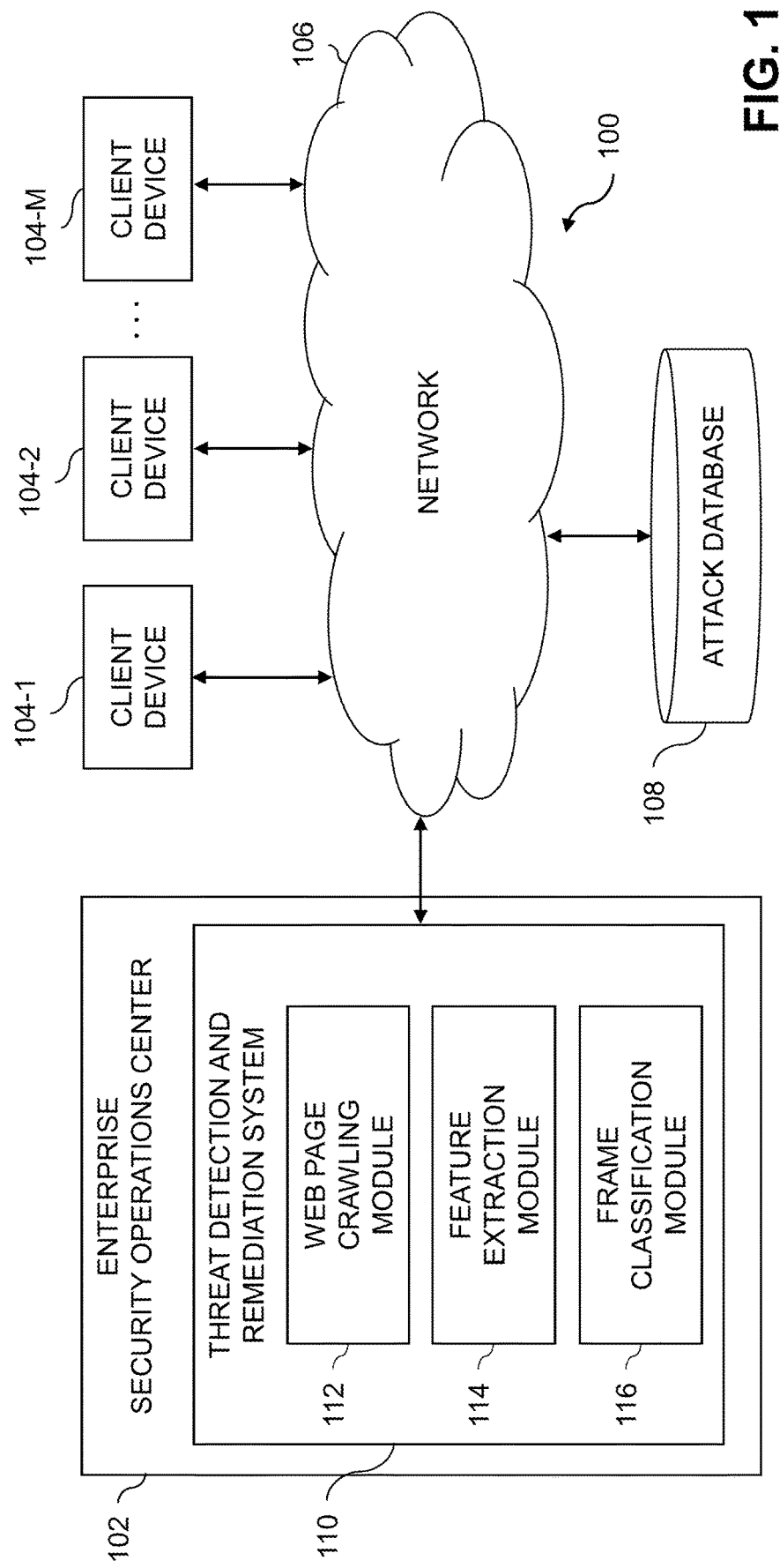
FIG. 1 is a block diagram of an information processing system for detecting frame injection in an illustrative embodiment of the invention.

FIG. 1 shows an information processing system 100 configured in accordance with an illustrative embodiment. The information processing system 100 is assumed to be built on at least one processing platform and provides functionality for detecting frame injection through web page analysis. Frame injection, as used herein, refers to malicious or potentially malicious frames inserted into a web page by an attacker. An injected frame, therefore, refers to a malicious or potentially malicious frame. In this embodiment, the system 100 more particularly comprises an enterprise security operations center (SOC) 102 and a plurality of client devices 104-1, 104-2, . . . 104-M, collectively referred to herein as client devices 104. The client devices 104 are coupled to a network 106. Also coupled to the network 106 is an attack database 108, which may store information relating to previously classified web pages, frames, frame features, etc.

The client devices 104 may comprise, for example, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers."

The client devices 104 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing devices are possible, as will be appreciated by those skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The attack database 108, as discussed above, is configured to store and record information relating to threats and attacks including information related to previously classified web pages or frames thereof, and to various features extracted from such frames. The attack database 108 may, in some embodiments, store a blacklist of known malicious or potentially malicious frames or web pages, as well as other information characterizing known malicious or potentially malicious frames or web pages including previous patterns of attack (e.g., particular sets of extracted features of blacklisted frames) used by the known malicious or potentially malicious frames. In other embodiments, various additional or alternative information may be stored in attack database 108, such as a whitelist of known benign frames or web pages, or information associated with known benign frames (e.g., particular sets of extracted features of whitelisted frames).

The attack database 108 in some embodiments is implemented using one or more storage devices associated with the enterprise SOC 102. Such storage devices may comprise, for example, storage products such as VNX® and Symmetrix VMAX® storage arrays, software-defined storage products such as ScaleIO™ and ViPR®, flash-based storage arrays such as Unity, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from Dell EMC. A variety of other storage products may be utilized to implement at least a portion of the storage devices associated with the enterprise SOC 102.

Although not explicitly shown in FIG. 1, one or more input-output devices such as keyboards, displays or other types of input-output devices may be used to support one or more user interfaces to the enterprise SOC 102, as well as to support communication between the enterprise SOC 102 and other related systems and devices not explicitly shown.

In the present embodiment, alerts or notifications generated by a threat detection and remediation system 110 of the enterprise SOC 102 are provided over network 106 to client devices 104, or to a system administrator, information technology (IT) manager, or other authorized personnel via one or more security or host agents. Such security or host agents may be implemented via the client devices 104 or by other computing or processing devices associated with a system administrator, IT manager or other authorized personnel. Such devices can illustratively comprise mobile telephones, laptop computers, tablet computers, desktop computers, or other types of computers or processing devices configured for communication over network 106 with the enterprise SOC 102 and the threat detection and remediation system 110. For example, a given security or host agent may comprise a mobile telephone equipped with a mobile application configured to receive alerts from the enterprise SOC 102 or the threat detection and remediation system 110 and to provide an interface for the security agent to select particular remedial measures for responding to the alert or notification. Examples of such remedial measures may include blocking access to one or more web pages having a frame (e.g., an inline frame or iframe) that is potentially malicious, requiring web pages with potentially malicious iframes to be run in a sandboxed or other protected environment on one or more of the client devices 104, requiring user input or authentication to visit web pages having potentially malicious iframes, triggering further review of web pages having potentially malicious iframes, etc.

It should be noted that a "security agent" or "host agent" as these terms are generally used herein may comprise an automated entity, such as a software entity running on a processing device. Accordingly, a security agent or host agent need not be a human entity.

As shown in FIG. 1, the enterprise SOC 102 comprises threat detection and remediation system 110. As will be described in further detail below, the threat detection and remediation system 110 is configured to detect frame injection through web page analysis.

Although shown as an element of the enterprise SOC 102 in this embodiment, the threat detection and remediation system 110 in other embodiments can be implemented at least in part externally to the enterprise SOC 102, for example, as a stand-alone server, set of servers or other type of system coupled to the network 106. In some embodiments, the threat detection and remediation system 110 may be implemented at least in part within one or more of the client devices 104.

The threat detection and remediation system 110 in the FIG. 1 embodiment is assumed to be implemented using at least one processing device. Each such processing device generally comprises at least one processor and an associated memory, and implements one or more functional modules for controlling certain features of the threat detection and remediation system 110. In the FIG. 1 embodiment, the threat detection and remediation system 110 comprises a web page crawling module 112, a feature extraction module 114 and a frame classification module 116.

The web page crawling module 112 is configured to obtain one or more web pages to analyze. The web pages may be obtained utilizing a static web crawler implemented by the web page crawling module 112. In some embodiments, a web page is obtained by the web page crawling module 112 by intercepting requests from one of the client devices 104 to access a web page that is not in a whitelist maintained in the attack database 108.

The feature extraction module 114 is configured to parse the web pages obtained by the web page crawling module 112 to identify frame tags for inline frames of the web pages. For each identified frame tag, the feature extraction module 114 will extract a set of features of a corresponding inline frame. The extracted set of features include style features, destination features, and context features of the identified frame tags.

The frame classification module 116 is configured to classify the inline frames as one of a malicious frame type (e.g., as injected frame tags) and a benign frame type. Responsive to classifying a given frame tag as the malicious frame type, the frame classification module 116 controls access by the client devices 104 to its associated web page. This may involve blocking access by the client devices 104 to web pages which contain frame tags classified as malicious, or causing such web pages to be opened in sandboxed or other protected application environments on the client devices 104. The frame classification module 116 may also or alternatively generate a notification sent to a security agent as described above.

Additional details regarding the web page crawling module 112, feature extraction module 114 and frame classification module 116 will be described in further detail below with respect to FIGS. 2-8.

It is to be appreciated that the particular arrangement of the enterprise SOC 102, threat detection and remediation system 110, web page crawling module 112, feature extraction module 114 and frame classification module 116 illustrated in the FIG. 1 embodiment is presented by way of example only, and alternative arrangements can be used in other embodiments. As discussed above, for example, the enterprise SOC 102, threat detection and remediation system 110, web page crawling module 112, feature extraction module 114 and frame classification module 116 may in some embodiments be implemented internal to one or more of the client devices 104. As another example, the functionality associated with the web page crawling module 112, feature extraction module 114 and frame classification module 116 may be combined into one module, or separated across more than three modules with the multiple modules possibly being implemented with multiple distinct processors or processing devices.

At least portions of the web page crawling module 112, feature extraction module 114 and frame classification module 116 may be implemented at least in part in the form of software that is stored in memory and executed by a processor.

It is to be understood that the particular set of elements shown in FIG. 1 for detecting frame injection through web page analysis is presented by way of illustrative example only, and in other embodiments additional or alternative elements may be used. Thus, another embodiment may include additional or alternative systems, devices and other network entities, as well as different arrangements of modules and other components.

By way of example, in other embodiments, the threat detection and remediation system 110 may be implemented external to enterprise SOC 102, such that the enterprise SOC 102 can be eliminated.

In some embodiments, the threat detection and remediation system 110 may be part of or otherwise associated with a system other than the enterprise SOC 102, such as, for example, a critical incident response center (CIRC), a security analytics system, a security information and event management (SIEM) system, etc.

The threat detection and remediation system 110 and other portions of the system 100, as will be described in further detail below, may be implemented at least in part using one or more processing platforms including public or private cloud infrastructure, or other distributed virtual infrastructure.

Figure 2:
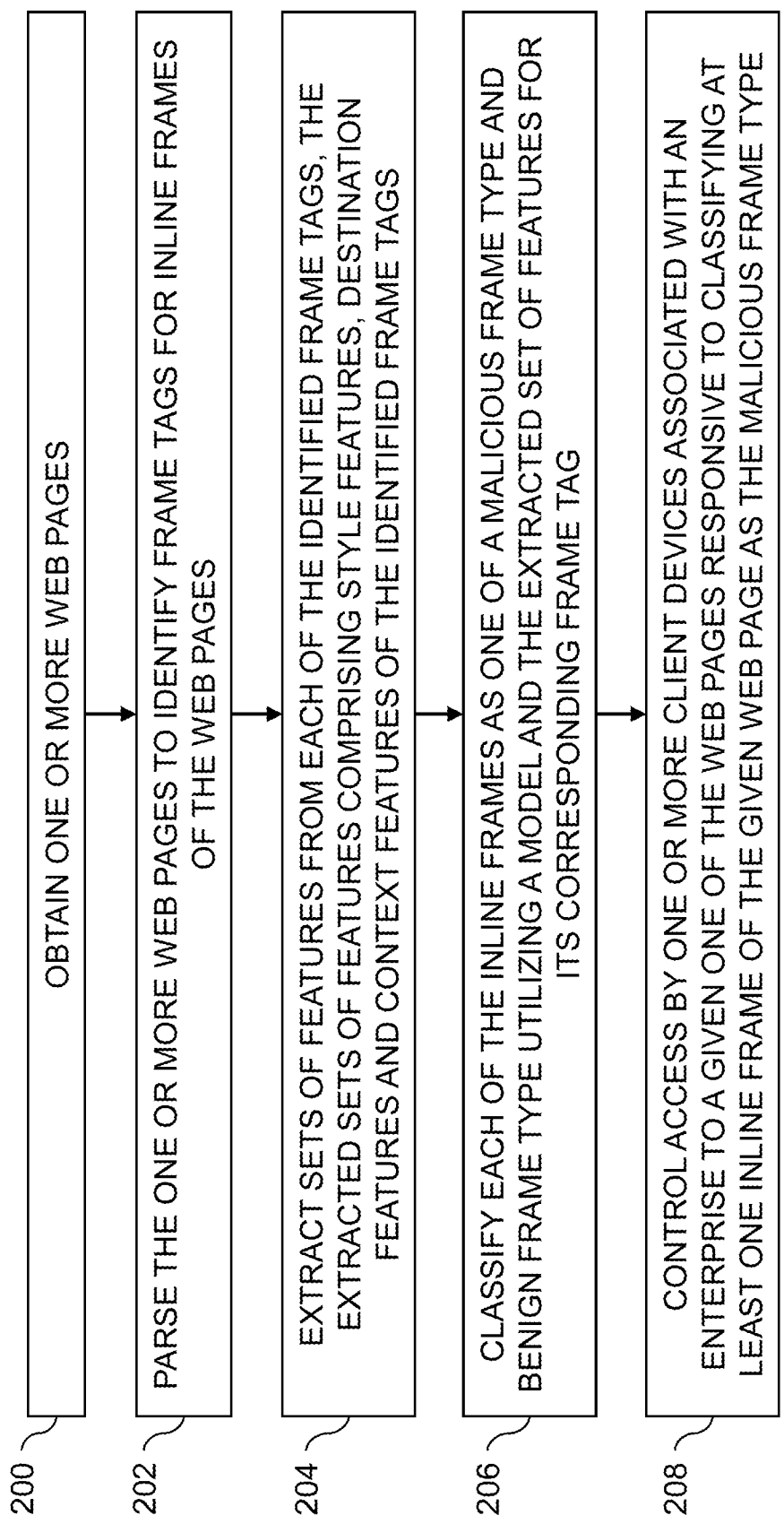
FIG. 2 is a flow diagram of an exemplary process for detecting frame injection in an illustrative embodiment.

An exemplary process detecting frame injection through web page analysis will now be described in more detail with reference to the flow diagram of FIG. 2. It is to be understood that this particular process is only an example, and that additional or alternative processes for detecting frame injection can be carried out in other embodiments.

In this embodiment, the process includes steps 200 through 208. These steps are assumed to be performed by the threat detection and remediation system 110 utilizing the web page crawling module 112, feature extraction module 114 and frame classification module 116. The process begins with step 200, obtaining one or more web pages. Step 200 may involve utilizing a static web crawler that is configured to download the web pages without execution. In some embodiments, step 200 involves intercepting a request by one of the client devices 104 to access a web page that is not whitelisted in the attack database 108.

In step 202, the web pages obtained in step 200 are parsed to identify frame tags for one or more inline frames or iframes of the web pages. Sets of features are extracted from each of the identified frame tags in step 204. The extracted sets of features comprise style features, destination features, and context features of the identified frame tags.

Step 206 may include extracting the style features by parsing style attributes of the identified frame tags to generate feature values associated with display of the corresponding iframes. The features values associated with display of the iframes may include feature values associated with positioning of the iframes and feature values associated with visibility of the iframes.

Step 206 may also include extracting the destination features by parsing a uniform resource locator (URL) value from source (src) attributes of the iframes to generate feature values associated with construction of the URL values. The features values associated with construction of the URL values may include features values associated with a subdomain and top level domain (TLD) of the URL values, feature values associated with query parameters and fragments of the URL values, feature values associated with the length and respective counts of digits and letters in one or more portions of the URL values, etc.

Step 206 may further include extracting the context features by parsing one or more hypertext markup language (HTML) tags of the given web page to generate a set of features associated with context of the iframes in their associated web pages. The features values associated with context of the iframes in their associated web pages may include feature values associated with a distance of an iframe tag relative to a Domain Object Model (DOM) tree of its associated web page, a starting HTML tag of the associated web page, an ending HTML tag of the associated web page, a body tag of the associated web page, and a head tag of the associated web page. The feature values associated with context of the iframes in their associated web pages may also include feature values associated with respective numbers of HTML, body and head tags in the associated web page, feature values associated with a web template utilized by the associated web page, and feature values associated with a domain of the URL value of the iframe relative to a domain of the associated web page.

In step 206, each of the iframes is classified as one of a malicious frame type and a benign frame type utilizing a model and the extracted set of features for its corresponding frame tag. The model used in step 206 may comprise a machine learning model trained using a training data set comprising a plurality of benign frame tags and a plurality of malicious frame tags. The machine learning model may comprise one of a random forest model, a k-nearest neighbor (KNN) model, a support vector machine (SVM) model, and a decision tree model.

In step 208, access by the client devices 104 to a given one of the web pages is controlled responsive to classifying at least one iframe of that given web page as the malicious frame type. Step 208 may include preventing the client devices 104 from accessing the given web page, or causing the given web page to be opened in a sandboxed or other protected application environment on the client devices 104. Step 208 may further or alternatively include generating a notification to a security agent as described above.

Figure 3:
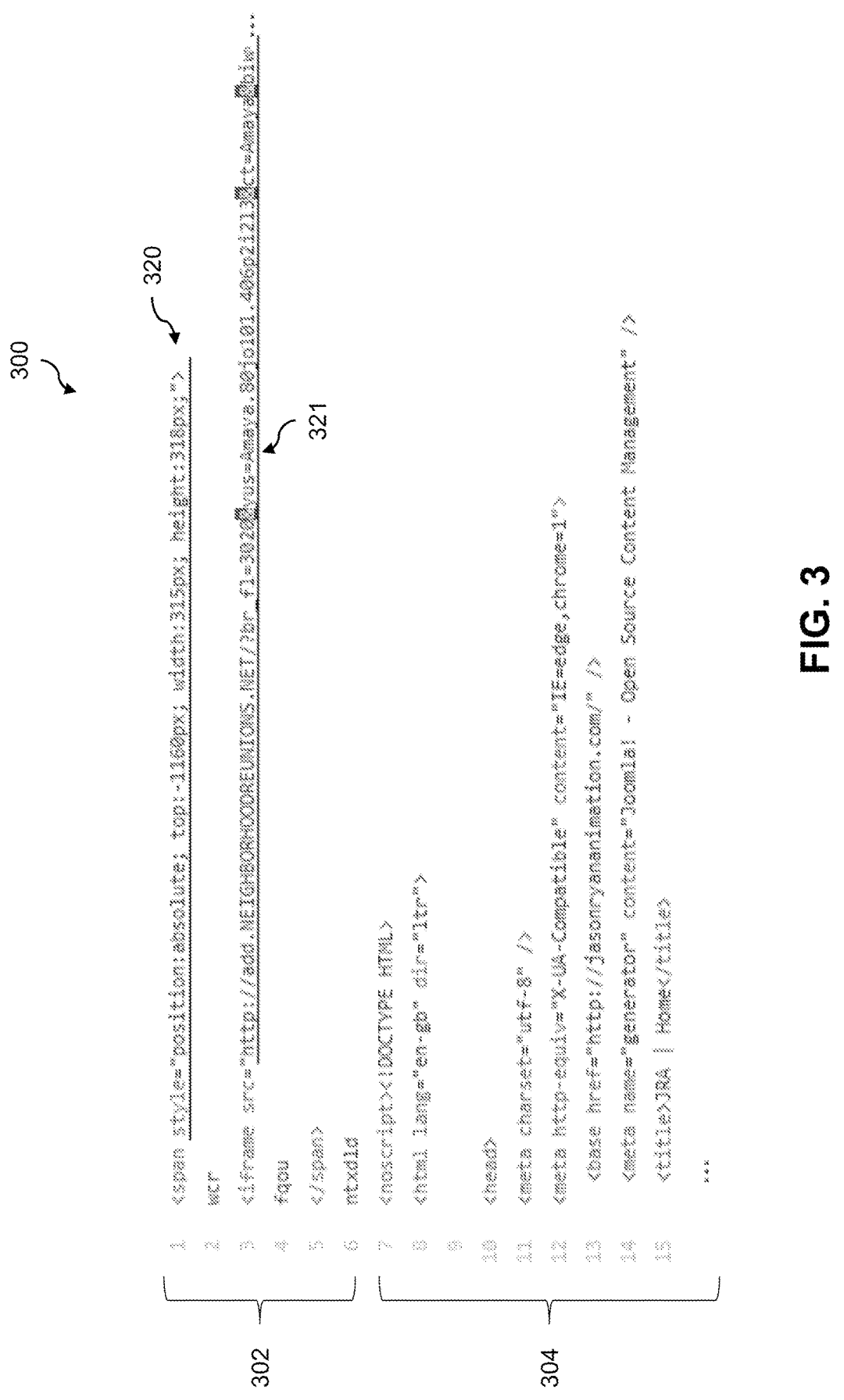

In the past decade, there has been a strong trend of content consolidation in web technologies. Today, a web page delivered to a user usually contains content pulled from many external sources, such as advertising platforms, social network sites, and tracking services. A typical integration primitive employed by website designers is HTML frame tags, an example of which is shown in FIG. 3. As shown in FIG. 3, an HTML tag may be used to integrate content from an external source by specifying the URL source and tag style in a frame tag, allowing the remote content to be automatically rendered in a user's web browser.

Unfortunately, the HTML frame tag injection technique is also a powerful weapon for malicious actors, such as web hackers. After an attacker gains control of a compromised web site (e.g., through Structured Query Language (SQL) or other code injection and credential harvesting), a typical behavior is to make the compromised website a gateway to a malicious web infrastructure (MWI) (e.g., a malware delivery network (MDN)) by injecting an iframe in a web page of the web site. The next time a visitor comes to that web page of the compromised web site, the iframe will be immediately rendered and dumps malicious content to the visitor's web browser. The use of iframes may provide the major glue for a MWI, such as in the RIG Exploit Kit.

Following the gateways is recognized as an important step towards finding the cores of MWI. To this end, illustrative embodiments provide techniques for discovering frame tags intentionally injected by attackers into compromised web pages. Some embodiments, for example, use machine learning based approaches for detecting such frame injection. Embodiments rely on a number of insights into the use of frame tags by attackers. First, the URL associated with a malicious frame tag should exhibit abnormal patterns relative to "legitimate" or non-malicious URLs. Such differences may be exhibited in the URL length, domain levels and parameters, and various other features described in further detail below. Second, a malicious frame tag is usually located in places of an HTML document that are not likely to be touched by legitimate or non-malicious web developers. For example, malicious frame tags are often placed at the very beginning or end of the HTML document. Third, the injected frame tag is usually configured to be invisible by playing with tag attributes, so as to avoid catching the attention of visitors to the compromised web page or website. These insights are used in some embodiments to build a frame injection detection system such as system 100. In some embodiments, such a frame injection detection system provides for highly reliable detection accuracy (e.g., over 99%). It should be appreciated that the various features used for classifying malicious frame injection all reflect distinctive patterns of frame injection, though no one feature may necessarily lead to accurate detection only by itself. Machine learning techniques, such as random forest, may be used in some embodiments to provide for accurate detection of frame injection.

Illustrative embodiments provide a number of advantages relative to conventional techniques. For example, some embodiments utilize a new set of distinctive features for characterizing how a malicious iframe is injected into a web page, including features concerning the context, position and destination of the iframe. Some embodiments further provide a new detection system capable of predicting the maliciousness of an iframe utilizing machine learning models. Further, the detection system performs frame tag-level detection, in contrast with domain-level, page-level or URL-level detection.

A frame tag allows a window of a web page to be split into different regions, with each linked to a distinct document. There are four frame types supported by common web browsers, including: <frameset> which contains a set of frames aligned by rows or columns; <frame> which is a single region within a frameset displaying the content under the root host; <noframe> which contains normal HTML content when frame is not supported; and <iframe> which is an inline frame that can display the content of a remote host. Except iframe, the other frame types were deprecated by the current HTML5 standard. Besides, iframe is the most popular attack vector under this category given its capability of rendering content from hosts fully controlled by attackers. Thus, systems described herein in some embodiments focus on the iframe tag type.

How an iframe is displayed depends on a set of tag attributes. For example, height and width attributes can be set to control the size of an iframe. The alignment of content inside the iframe can be configured utilizing attributes such as margin height, margin width and align. In addition, the style attribute describing the Cascading Style Sheet (CSS) property can be used for the same purpose, along with providing additional factors for iframe display. Such additional factors include, for example, specifying the position of an iframe through two properties (top and position) inside the attribute value. When the iframe tag has a parent in the Document Object Model (DOM) tree, how the iframe is displayed will also be influenced by the parent.

An iframe can point to a page through setting the src attribute to a URL. The URL can be either a relative path to the root host (e.g., /iframe1.html) or an absolute path (e.g., http://example.com/iframe1.html). Starting from HTML5, developers can enforce stricter policies on iframe tags through the sandbox attribute, which limits what can be executed inside the iframe. For instance, if a field allow-scripts is not enabled in sandbox, no JavaScript code is allowed to run. Though it reduces damage when the iframe document is malicious, this attribute is rarely used.

When adding an iframe to a web page, the developer can choose to follow an offline approach by asserting the iframe tag into the web page, or a runtime approach by putting a script tag which inserts the iframe tag when the JavaScript code inside the script tag is later executed in the user's web browser. While certain embodiments described herein focus on the offline approach, embodiments can also be extended to the runtime approach by unfolding the JavaScript code in an emulated environment followed by performing analysis similar to that described with respect to the offline approach.

FIG. 3 shows an example of iframe injection, which may be detected using the offline approach. FIG. 3 shows a portion of a web page 300, including the first fifteen lines of the web page (and only a left part of line 3) for clarity. Section 302 of the web page 300 shows the injected iframe, while section 304 of the web page 300 shows the original content of the web page 300. The injected iframe 302 includes a hidden style 320, as well as an abnormal URL 321. Further, the location of the injected iframe 302 is abnormal, in that it is as the very beginning of the HTML document for the web page 300. These features (e.g., the abnormal location, the hidden style 320 and the abnormal URL 321) are all indicators of compromise for the injected iframe. Based on these features, the injected iframe 302 may be classified as malicious using the techniques described herein.

For website hackers, inserting an iframe tag into the web page of a compromised website is a popular attack vector or strategy. Visitors to the web page with the injected iframe will automatically load the iframe which contains the malicious document. The iframe can be hidden from visitors by manipulating the relevant iframe attributes. In the FIG. 3 example, the first seven lines of code show the injected iframe 302. The injected iframe 302 is not shown in the browser window, as the top field of the style attribute is set to a very large negative value (e.g., −1160 pixels (px)). In the injected iframe 302, the attacker chooses to set the style on the parent span node rather than setting the style in the iframe tag. In the FIG. 3 example the abnormal URL 321 points to a remote site which aims to dump RIG exploit code on the user's browser.

Another characteristic commonly found on compromised web pages is the abnormal location of an injected iframe tag. In the FIG. 3 example, not only is the iframe tag 302 listed in the very beginning, it is even before the <html> tag. The hacker has virtually unlimited options for placing an injected iframe, but a location inside the DOM tree is rarely chosen because the rendering of the iframe could be impacted by the parent node in a way that is not desired by the hacker. On the contrary, legitimate or non-malicious iframes usually show up inside the DOM tree.

The ultimate goal of iframe injection is to let the compromised website or web page load attackers' code, which attacks the visitor's machine through methods like drive-by-download. The injection of the script tag and object tag could achieve the same goal, but only a single type of code (e.g., JavaScript, Adobe® Flash, Java code, etc.) is allowed. Instead, the document behind the iframe tag can render mixed web code. Some embodiments focus on iframe injection rather than script and object injection. The techniques described with respect to detecting iframe injection, however, may be extended to detecting script and object injection in some embodiments.

Figure 4:
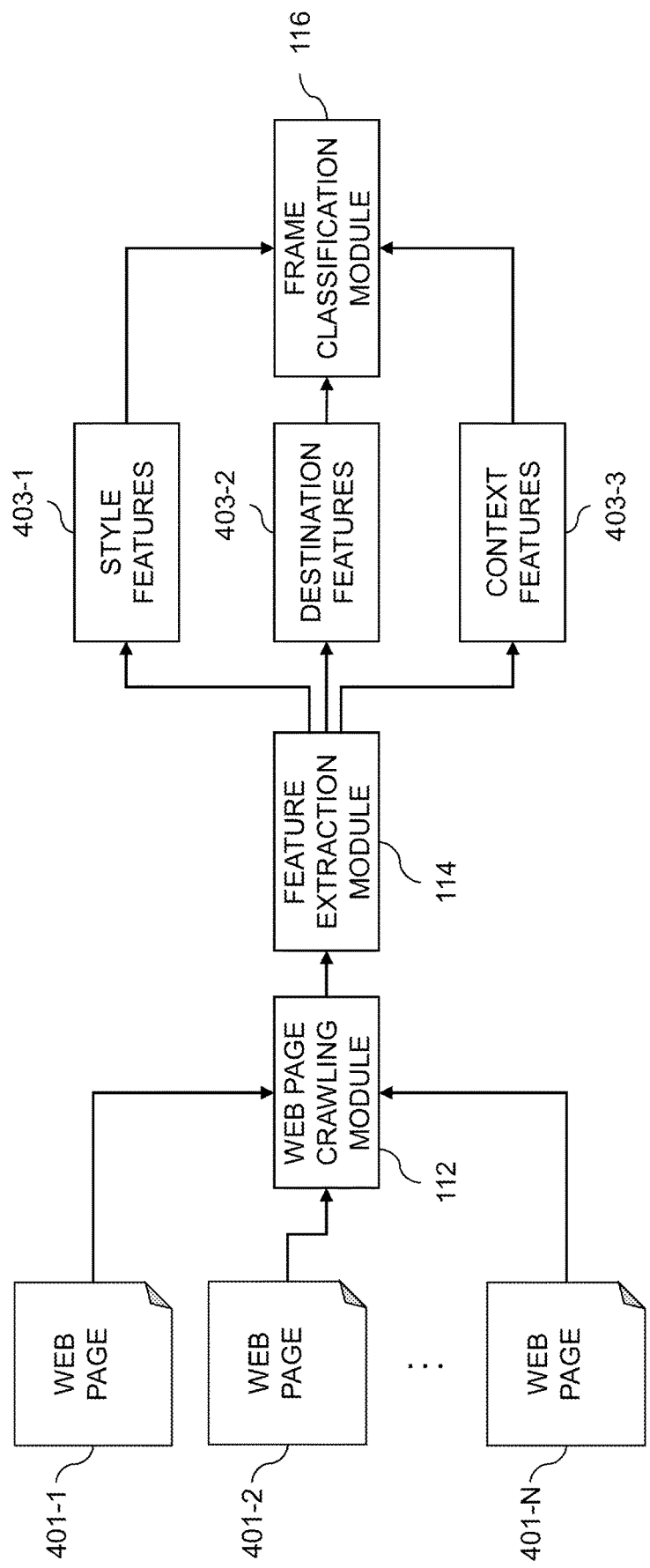
FIG. 4 shows a processing flow for detecting frame injection in an illustrative embodiment.

To help website owners, security companies and other entities automatically identify injected iframes, embodiments provide a system that exploits the unique characteristics in attackers' strategies for iframe injection. FIG. 4 illustrates the processing flow for detecting frame injection, such as utilizing the web page crawling module 112, feature extraction module 114 and frame classification module 116 of the threat detection and remediation system 110 of FIG. 1.

The threat detection and remediation system 110 processes web pages 401-1, 401-2, . . . 401-3 (collectively, web pages 401) to identify or classify abnormal iframe tags. To do so, the web page crawling module 112 deploys a web crawler and feeds the crawled web pages 401 to the feature extraction module 114. In some embodiments, the web page crawling module 112 deploys a static web page crawler which downloads the web pages 401 without execution, as the features used for classification in some embodiments are static features. An example of a static web page crawler which may be used in some embodiments is Scrapy. Each web page 401 may first be parsed by the feature extraction module 114 or the static crawler deployed by the web page crawling module 112 to find all iframe tags. In some embodiments, a DOM parser such as Beautiful Soup may be used to find iframe tags in the web pages 401.

The feature extraction module 114 then extracts features from each of the iframes that are found in the web pages 401. In some embodiments, three categories of features are used for determining whether an iframe is malicious, including: style features 403-1, which include features of the display style for the iframe as determined by tag attributes; URL or destination features 403-2, which include features related to the destination of the iframe redirection; and context features 403-3, which include features relating to the context of the iframe in the HTML document (e.g., the position of the iframe in the document and the surrounding tags).

To combine the style features 403-1, destination features 403-2 and context features 403-3 for better detection results, some embodiments utilize a training dataset that contains labeled malicious and benign iframes and hosting web pages, and applies cross-validation utilizing different machine learning models (e.g., decision tree, random forest, SVM, KNN, etc.) to find the best model and corresponding parameters. The training dataset in some embodiments is obtained from the attack database 108 described above.

After the training stage, the model can be deployed by the frame classification module 116 to detect on-going malicious iframe injections. False alarms may be triggered when benign iframe tags exhibit similar feature values to malicious iframe tags, like hidden style attributes. In some embodiments, benign iframe tags may be filtered out using a whitelist obtained from the attack database 108 or another source. The whitelist, for example, may indicate reputable websites. To determine reputable websites or otherwise build or construct the whitelist, various sources may be used including the Alexa Top 1,000 sites, EasyList which documents known advertising platforms, and EasyPrivacy which documents known tracking services.

In some embodiments, the threat detection and remediation system 110 (utilizing web page crawling module 112, feature extraction module 114 and frame classification module 116) provides fine-grained information about web attacks. Such fine-grained information goes beyond conventional techniques which may focus only on detecting malicious URLs or web pages. On a compromised web page, the malicious content (e.g., frame tags) may be only a very small portion of the overall content. Thus, a conventional technique which only provides web page-level or URL-level detection wastes analysts time, in that the analyst must expend significant effort to pinpoint the malicious frame tags. Some embodiments directly extract the malicious content at the tag level, and thus significantly reduce the workload for analysts.

Further, some conventional techniques may be rule-based, which can be evaded when the attacker makes just a small change to the payload. Other conventional techniques are behavior-based, which rely on dynamic execution and are thus time consuming. In contrast, the threat detection and remediation system 110 in some embodiments extracts static features from individual HTML web pages utilizing web page crawling module 112 and feature extraction module 114, incurring negligible overhead. By applying machine learning models to assess the likelihood of maliciousness in the frame classification module 116, some embodiments can further deal with non-extensive changes to payload content that may be missed by conventional techniques.

To avoid detection by the frame classification module 116, an attacker may adjust their injection strategy. Such adjustment, however, comes with side effects that attackers cannot avoid. For example, an attacker can change the location of the injected iframe, such as by putting the injected iframe close to the tags at the middle of the DOM tree. Under this strategy, however, the injection points have to be carefully selected to avoid breaking the logic of the DOM tree. This requires comprehensive code analysis that incurs high operational costs for the attacker. As another example, the attacker may choose to utilize dynamic content (e.g., Adobe® Flash, Java, Silverlight®, etc.) instead of iframes to evade detection. Such dynamic content, however, is often subject to content blocking policies enforced by the latest web browsers. An attacker may also attempt to obfuscate the iframe tag utilizing runtime scripts. This may be addressed in some embodiments utilizing de-obfuscation techniques such as emulated execution. Though it is possible to "mute" one or more features that are used in some embodiments for detection of malicious frame injection, evading detection by the frame classification module 116 is very difficult as the frame classification module 116 in some embodiments utilizes a machine learning model or models which incorporate many features, most of which make good contribution to detection.

FIGS. 5A-5D show portions 500-1, 500-2, 500-3 and 500-4, respectively, of a table of features used in some embodiments for detecting malicious iframe injection. The portions 500-1, 500-2, 500-3 and 500-4 are collectively referred to herein as table 500. The table 500 includes 46 features under three categories (e.g., style features 403-1, destination features 403-2 and context features 403-3).

Figure 6:
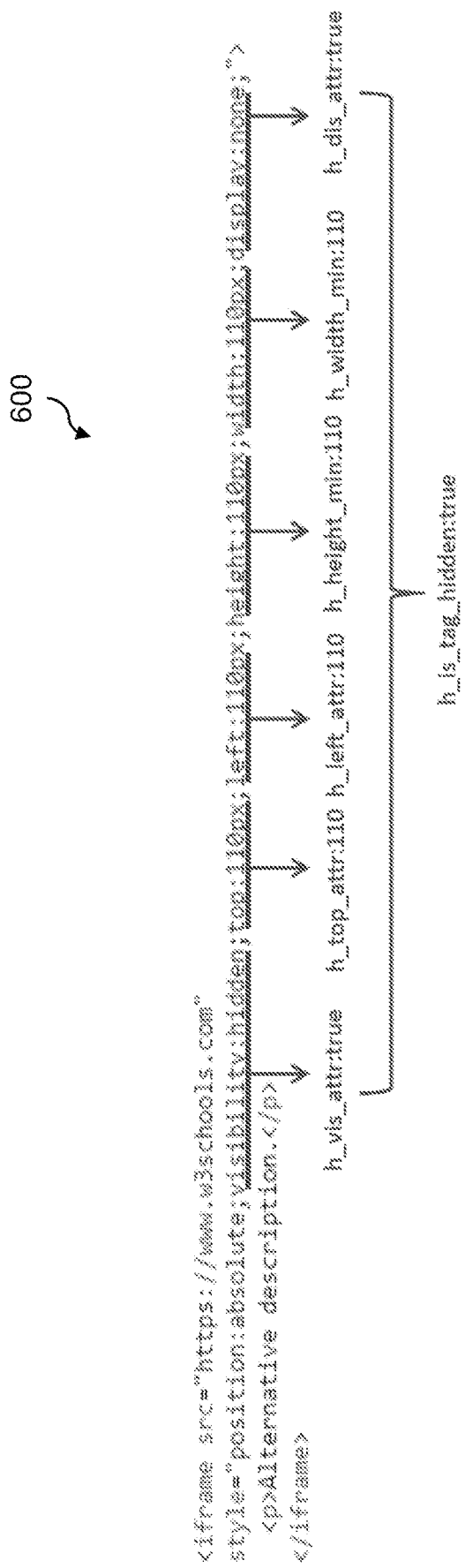
FIG. 6 shows an example of extracting style-based features from a frame in an illustrative embodiment.

Style features 403-1 include the features with identifiers (IDs) 1-7 in the table 500. For a parsed iframe tag, the system extracts the value of the style attribute, and then splits the properties by a semicolon. FIG. 6 shows an example of a portion of an iframe tag 600, along with extraction of style features therefrom. Outside style, width and height attributes are used for h_width_min (e.g., feature ID 1) and h_height_min (e.g., feature ID 5) when showing in the iframe tag. For feature IDs 1-6, the attribute values of both the iframe tag and its parent node are considered. As shown in the FIG. 3 example, an attacker could set the parent node hidden to cover the child iframe node, and the approach used in some embodiments makes this evasion attempt ineffective. In particular, the minimum value of the iframe and its parent are used for feature IDs 1 and 5. The absolute maximum value is used for feature IDs 3 and 4. For feature IDs 2 and 6, if the value is true (e.g., "hidden" for feature ID 2 and "none" for feature ID 6) for either the iframe or its parent, then the corresponding feature value is true. For the numeric features (e.g., feature IDs 1, 3, 4 and 5), the feature value "none" is used when they are not declared anywhere in the iframe or its parent. Feature ID 7 (h_is_tag_hidden) is derived after feature values of feature IDs 1-6 are computed.

For the style features 403-1, the attacker's goal is typically to make the iframe invisible to visitors of the corresponding web page. The style features 403-1 measure whether the iframe style aligns with this goal. The iframe will be invisible if its position sits outside the visible region (e.g., very large positive or negative top and left), or it its display region only covers several pixels (e.g., very small height and width). Two thresholds $TH_{POS}$ and $TH_{SIZE}$ are used, and feature ID 7 is set to true if the position is larger than $TH_{POS}$ or the size is smaller than $TH_{SIZE}$. In some embodiments, $TH_{POS}$ is set to 500, and $TH_{SIZE}$ is set to 5 based on empirical analysis. It should be appreciated, however, that the values for these thresholds may vary as desired for a particular implementation. Feature ID 7 is also set to true if feature ID 2 or feature ID 6 is true.

Figure 7:
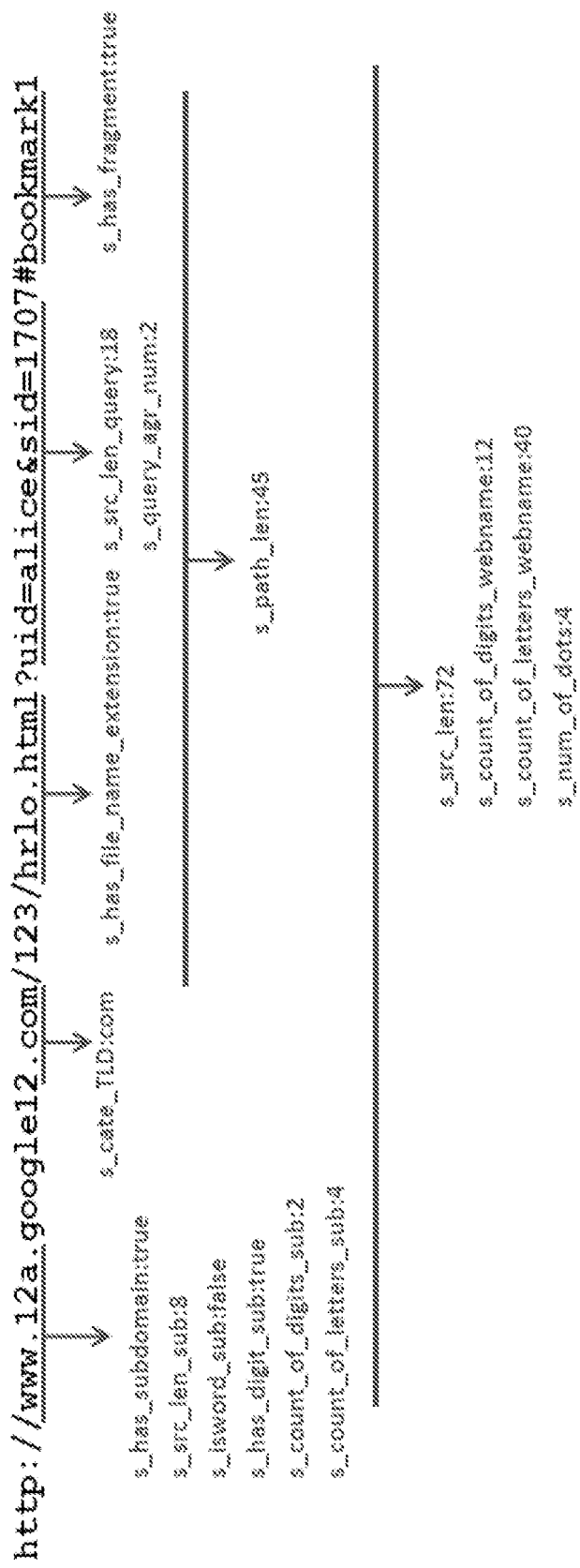
FIG. 7 shows an example of extracting destination-based features from a uniform resource locator in an illustrative embodiment.
Figure 8:
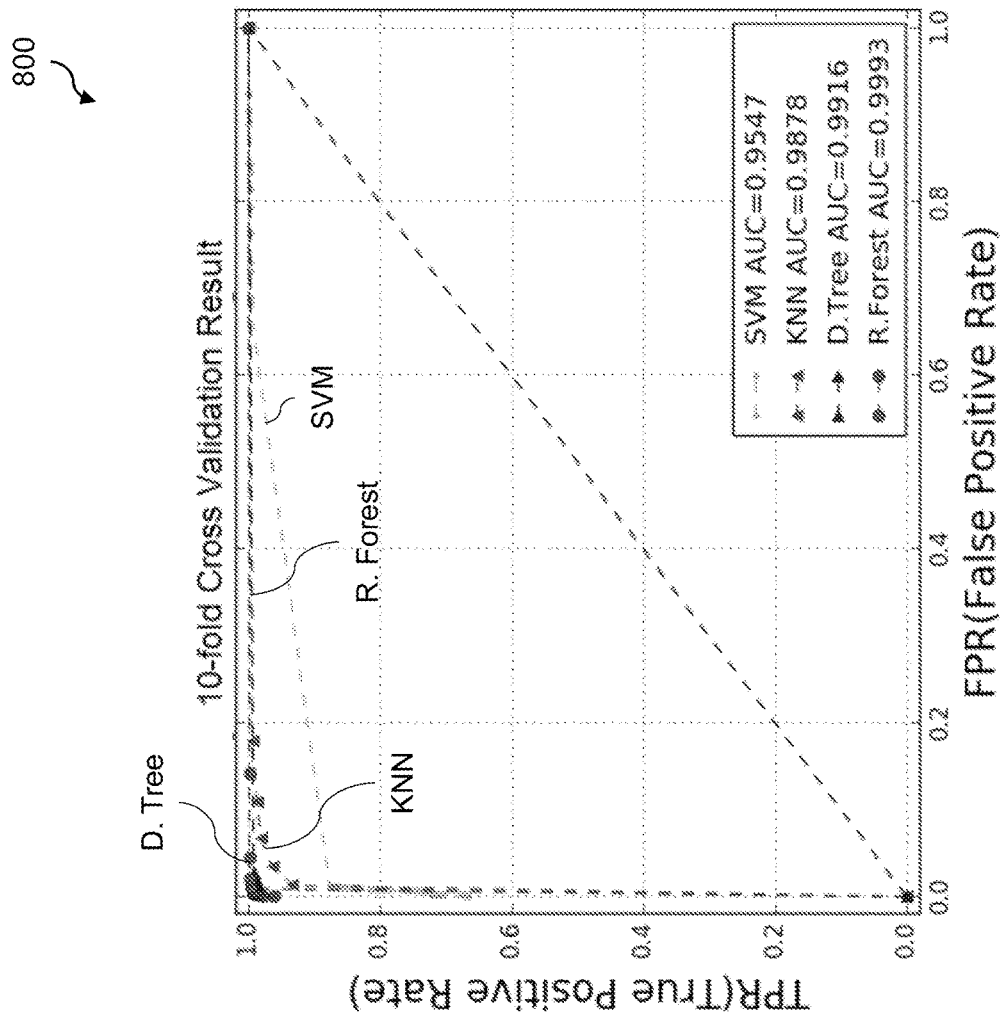
FIG. 8 shows a plot of classification results using various machine learning algorithms in an illustrative embodiment.

Destination features 403-2 include the features with IDs 8-23 in the table 500. The destination (e.g., the URL) of iframe redirection is extracted from the src attribute to obtain a number of features (e.g., feature IDs 11, 12 and 21). When the destination is not specified or is a relative path, the iframe will not be checked. Features are built around different components of the URL or destination, including its subdomain (e.g., feature IDs 8, 13, 14, 15, 18 and 19), TLD (e.g., feature ID 22), path (e.g., feature ID 9), query parameters and fragment (e.g., feature IDs 10, 20 and 23), as a malicious URL or destination is often constructed in a different way than a legitimate or non-malicious URL. For example, to evade domain blacklists, an attack can steal a domain owner's credential and create a subdomain to link the malicious host. Attackers are inclined to register or compromise domains under certain TLDs (e.g., like .ru) due to the loose policies enforced by the associated registrars. The HTTP GET request is used more often than the HTTP POST request when attackers want to collect visitors' information, and this information is usually encoded in the URL query parameter or fragment, resulting in a long path and querying string. When the malicious domain is generated algorithmically, the chances of embedding digits in the domain name will be higher than benign domains (e.g., feature IDs 16-19). The features in this category reflect attackers' preference or strategy in constructing malicious URLs. FIG. 7 shows an example destination or URL 700 that is parsed to identify the various destination features 403-2 shown in feature IDs 8-23 of table 500.

Context features 403-3 include the features with IDs 24-46 in the table 500. Through analysis, it is determined that the beginning or end of a document is more likely to hold malicious injected iframes than other portions of the document. As such, injected frames are usually close to the tags at upper levels of the DOM tree, like HTML, BODY and HEAD. When the iframe is inside the DOM tree, the number of levels between them is counted to measure how close the iframe stays to these tags and the document root (e.g., feature IDs 28-31). The minimum of the distance to the starting tag (e.g., <HTML>) and the ending tag (e.g., </HTML>) is also used. In addition, the distance is also represented by the number of lines, and is counted for the BODY, HTML and document root (e.g., feature IDs 34, 36 and 32, respectively). These values are divided by the total number of lines to obtain the feature values for feature IDs 35, 36 and 33, respectively, as normalization.

A legitimate iframe is usually descendant to HTML, BODY or HEAD, and therefore when it falls out, the feature values of feature IDs 24-26 are set to false indicating that the iframe is misplaced. Sometimes, the injected iframe comes together with extra HTML, BODY and HEAD, doubling the number of these tags. Feature values for feature IDs 42-44 are set to true when this occurs.

Exploiting the code vulnerability of a website, like through SQL injection and cross-site scripting (XSS), is a common way to gain control illegally. Websites powered by a web template (e.g., WordPress®, Joomla!®, Drupal®, etc.) are targeted most because the related vulnerabilities are easy to find. The META tag is analyzed to obtain the type of template being used, if any, and to set the value for feature ID 40. Finally, the system checks whether the iframe URL is on an external domain different from the hosting page (e.g., feature ID 45), and how many times the URL domain shows up in all the iframes enclosed by the hosting page (e.g., feature ID 46).

Computation of some of the feature values for context features 403-3 will now be described with respect to the web page 300 in the FIG. 3 example. In the FIG. 3 example, the iframe falls out of the DOM tree, and thus the feature values for feature IDs 24-26 will be set to false. The values for 1_abs_iframe (feature ID 32) and 1_abs_dis_iframe_html (feature ID 36) are set to 3 and 5 by counting line numbers. The value for b_content_type (feature ID 40) is set to "Joomla" as this keyword is found in the content attribute of the META tag. Values of other ones of the context features 403-3 may similarly be set by analyzing the web page or an iframe thereof.

It should be appreciated that the style features 403-1, destination features 403-2 and context features 403-3 shown in the table 500 are presented by way of example only, and that embodiments are not limited solely to use with these features. Further, embodiments do not necessarily need to utilize all of the features shown in table 500.

Combining the various style features 403-1, destination features 403-2 and context features 403-3 (e.g., the 46 features shown in table 500) to build an effective detection system is a very difficult task, even for a domain expert. Therefore, some embodiments utilize machine learning based approaches to build a model for detecting frame injection. The first step in building the model is to collect web pages containing iframe tags, which are divided into a malicious set known to be compromised and a benign set belonging to reputable domains. Different machine learning methods are tested and a tuning approach, such as 10-fold cross validation, is leveraged to find an optimal setting. In particular, some embodiments may set yielding the maximum area under the curve (AUC) value of the receiver operating characteristics (ROC) curve with a sufficient accuracy rate (e.g., over 90% or some other specified threshold) as optimal.

After the model is derived, it can be deployed by the frame classification module 116 to predict the maliciousness of each iframe found by the web page crawling module 112. The detection result may be enriched with context information before being verified by a human analyst, and the result list should be ordered by priority. Various factors may be used to assign priority to potentially malicious iframes that are detected by the frame classification module 116. In some embodiments, two factors are considered: the score produced by the machine learning model; and the size of the cluster (e.g., how many web pages containing the same iframe are detected). Providing a list of potentially malicious iframes, which may be prioritized as described, is an example of a remedial action which may be taken in response to detecting a potentially malicious iframe. Other remedial actions may be taken, possibly prior to verification by a human analyst, including blocking access to web pages containing potentially malicious iframes, requiring user authentication to access web pages containing potentially malicious iframes, requiring web pages containing potentially malicious iframes to be opened in a sandboxed or other protected environment, etc.

To test the malicious frame detection system, a dataset including 7,065 pages containing injected iframes was collected and downloaded from a public sandbox service. The dataset also included benign web pages, gathered by crawling Alexa top ranked sites, which are supposed to enforce strong defense mechanisms against site compromise. To make the malicious and benign data set balanced, the homepages from the top 10K sites were selected resulting in 7,451 benign web pages. A web page may contain multiple iframes, while only a subset (e.g., one) is placed by an attacker. To accurately pinpoint the malicious instance, tag-level data labeling is performed on the collected data. In particular, all URLs from src field of iframes are extracted and scanned against one or more blacklists. If at least one blacklist classifies the URL as malicious, the iframe and its hosting page is put into the malicious data set. All iframes from the benign dataset may be similarly scanned, and any of such iframes triggering an alarm are removed before training.

A number of machine learning algorithms for classification may be used to build a model for detecting iframe injection. In some embodiments, four such algorithms are tested: SVM, KNN, decision tree and random forest. The ROC curve from 10-fold cross validation on the training data set is shown in the plot 800 of FIG. 8. The plot 800 shows the true positive rate (TPR) and the false positive rate (FPR) for the SVM, KNN, decision tree (D. Tree) and random forest (R. Forest) algorithms trained using the dataset of known malicious and benign iframes. As seen from the result, each machine learning algorithm (with the exception of SVM) achieves a very high AUC (e.g., over 0.94) with over 90% accuracy rate. Among the four machine learning algorithms tested, random forest achieves the best performance with 0.9993 AUC. Random forest is well suited for security applications, particularly where the training dataset has noise (e.g., where labels may be inaccurate) and is high dimensional.

Conventional techniques for detecting malicious web pages tend to focus on labeling an entire page or its URL as malicious or not, and rely on features regarding page text, code, and traces from dynamic visits to detect web spam, phishing sites, URL spam, and general malicious web pages. Machine learning approaches may be used to classify URLs based on lexical, domain and IP information. Illustrative embodiments differ from such conventional techniques, providing deeper analysis to find individual iframes injected by attackers. Since a compromised web page usually contains both original (e.g., legitimate and non-malicious) iframes and injected (e.g., malicious) iframes at the same time, automatically finding the malicious ones can save analysts considerable time and computational resources for following a trail to find malicious hosts.

Various techniques may be used to distinguish malicious code from other benign code on a single web page. For example, to identify JavaScript code injected by attackers' snapshots of a web page may be captured over time and analyzed, with injected content being discovered in the differences in such snapshots over time. Such a solution, however, requires constantly monitoring websites to collect many snapshots, and further relies on an external oracle like antivirus software for classification. Illustrative embodiments, in contrast, can detect injected iframes using just one snapshot. Further, detection capability is self-contained in some embodiments. Other approaches may find indicators of compromise by monitoring changes of web honeypots set up for analysis. Illustrative embodiments do not ask for access to web honeypots for detecting injected iframes.

In some embodiments, a detection system is provided that is able to capture malicious iframe tags injected by attackers. The detection system in some embodiments models iframe injection over a number of style, destination and context features (e.g., over 40 features in total in some implementations) and leverages machine learning techniques (e.g., random forest) to achieve accurate classification of iframe tags. Illustrative embodiments achieve tag-level detection on a web page, saving significant time and resources in attack triaging and attribution.

It is to be appreciated that the particular advantages described above and elsewhere herein are associated with particular illustrative embodiments and need not be present in other embodiments.

Also, the particular types of information processing system features and functionality as illustrated in the drawings and described above are exemplary only, and numerous alternative arrangements may be used in other embodiments.

The information processing systems disclosed herein are illustratively implemented using one or more processing platforms, examples of which will be now be described in greater detail. A given such processing platform comprises at least one processing device comprising a processor coupled to a memory.

As mentioned previously, portions of an information processing system as disclosed herein illustratively comprise cloud infrastructure. The cloud infrastructure in some embodiments comprises a plurality of containers implemented using container host devices and may additionally or alternatively comprise other types of virtual resources such as virtual machines implemented using a hypervisor. Such cloud infrastructure can therefore be used to provide what is also referred to herein as a cloud computing environment. A given cloud computing environment may but need not accommodate multiple tenants.

The cloud infrastructure mentioned above may represent at least a portion of one processing platform. Another example of such a processing platform is a plurality of processing devices which communicate with one another over a network. Each such processing device comprises at least one processor coupled to at least one memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment.

Cloud infrastructure as disclosed herein can include cloud-based systems such as an Amazon Web Services (AWS) system. Other examples of cloud-based systems that can be used to implement at least portions of system 100 include Google Cloud Platform (GCP) and Microsoft Azure. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux container (LXC). The containers may run on virtual machines in a multi-tenant environment, although other arrangements are possible. The containers may be utilized to implement a variety of different types of functionality within the system 100. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 9 and 10. Although described in the context of system 100, these platforms may also be used to implement at least portions of other information processing systems in other embodiments.

Figure 9:
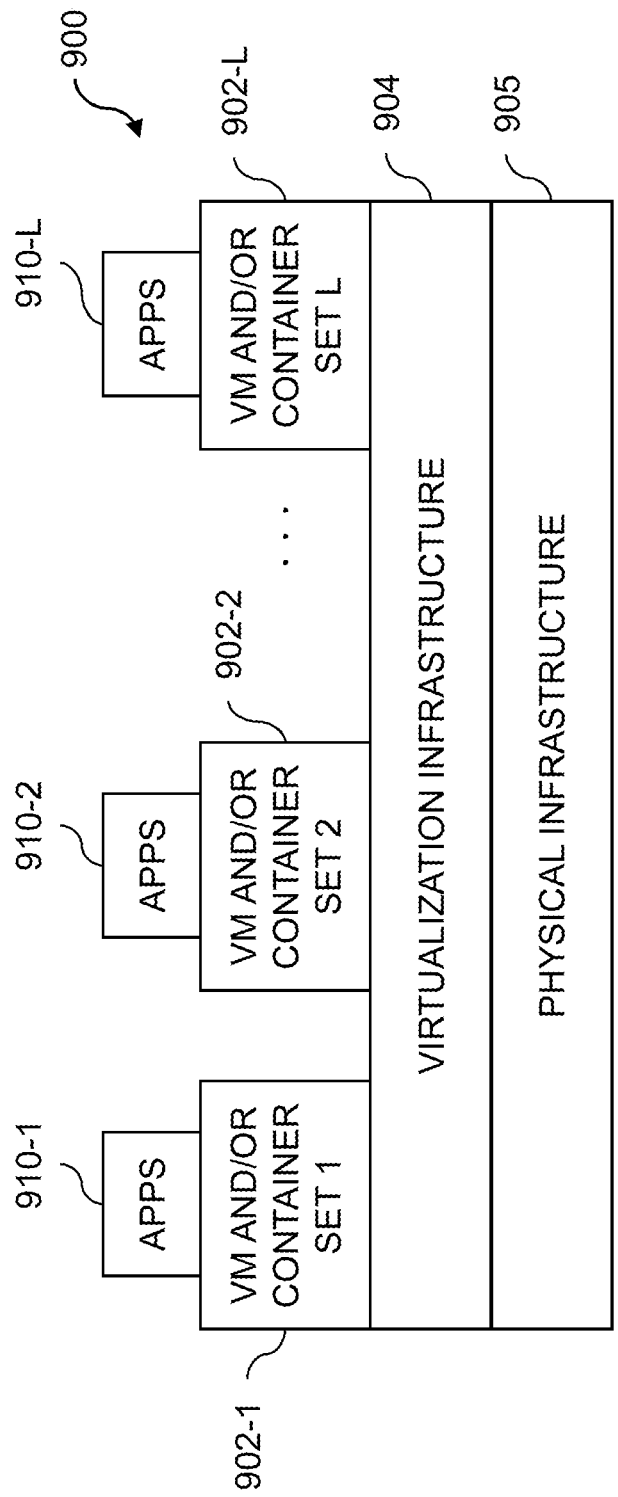
FIGS. 9 and 10 show examples of processing platforms that may be utilized to implement at least a portion of the FIG. 1 system.
Figure 10:
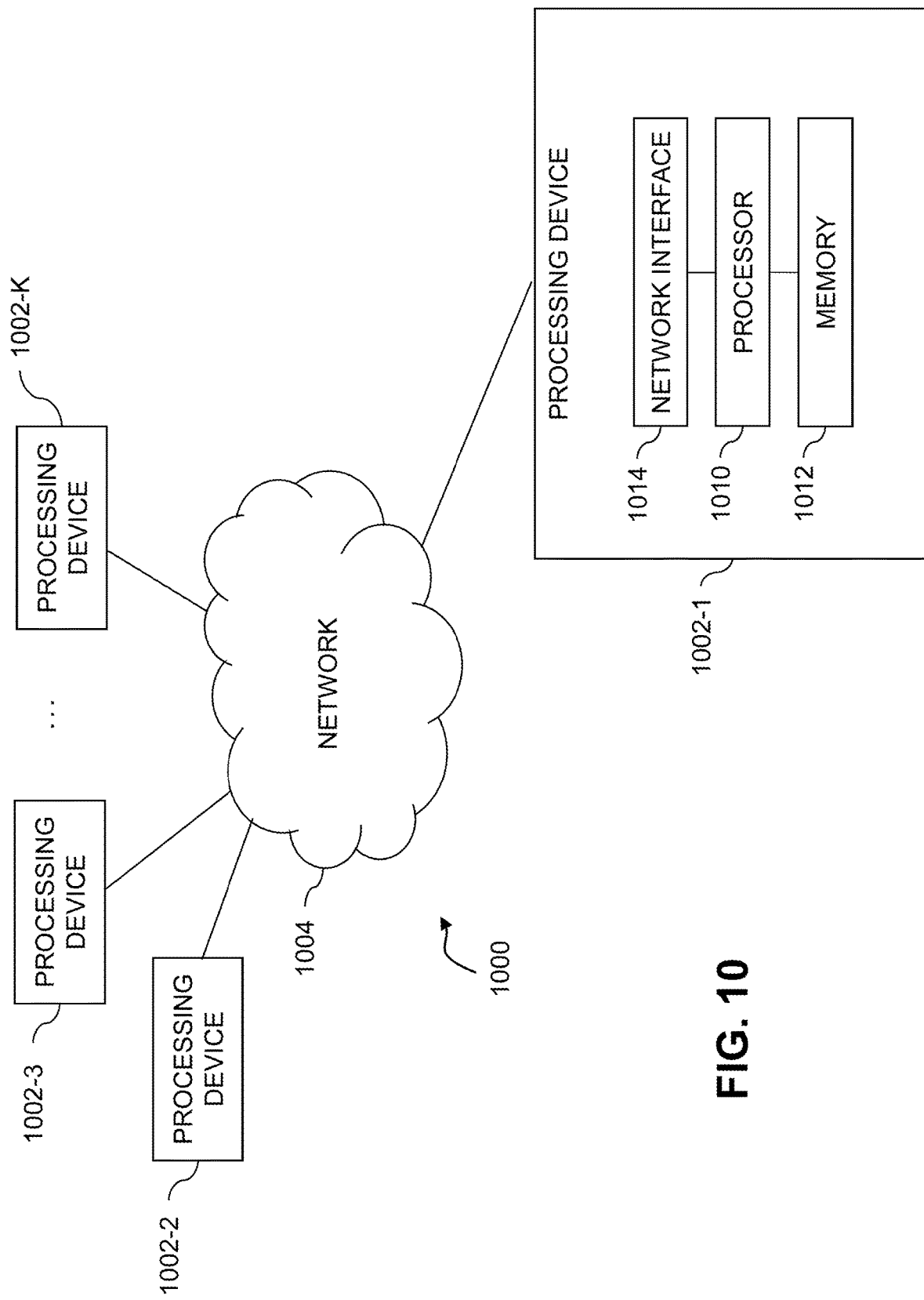

FIG. 9 shows an example processing platform comprising cloud infrastructure 900. The cloud infrastructure 900 comprises a combination of physical and virtual processing resources that may be utilized to implement at least a portion of the information processing system 100. The cloud infrastructure 900 comprises multiple virtual machines (VMs) and/or container sets 902-1, 902-2, . . . 902-L implemented using virtualization infrastructure 904. The virtualization infrastructure 804 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. Such implementations can provide functionality for detecting frame injection for one or more web pages crawled or otherwise processed by a given one of the VMs. For example, each of the VMs can implement such functionality for web pages that are crawled or otherwise processed on that particular VM. In other embodiments, different ones of the VMs may provide different functionality that collectively provides for detecting frame injection. For example, different VMs may be used to implement the web page crawling module 112, feature extraction module 114 and frame classification module 116 of the threat detection and remediation system 110.

An example of a hypervisor platform that may be used to implement a hypervisor within the virtualization infrastructure 904 is the VMware® vSphere® which may have an associated virtual infrastructure management system such as the VMware® vCenter™. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system. Such implementations can provide functionality for detecting frame injection for one or more web pages that are crawled or otherwise processed by different ones of the containers. For example, a container host device supporting multiple containers of one or more container sets can implement one or more instances of such functionality or logic. Different containers or container sets may also be used to implement the web page crawling module 112, feature extraction module 114 and frame classification module 116 of the threat detection and remediation system 110 in some embodiments.

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA) or other type of processing circuitry, as well as portions or combinations of such circuitry elements.

The memory 1012 may comprise random access memory (RAM), read-only memory (ROM), flash memory or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 902-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for detecting frame injection as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems in which it is desirable to provide the classification functionality described herein. Also, the particular configurations of system and device elements shown in the figures can be varied in other embodiments. Thus, for example, the particular types of style, destination and context features used for classification may be varied. Other features of the illustrative embodiments can also be varied. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. A method comprising:
    obtaining a given web page;
    parsing the given web page to identify one or more frame tags for one or more inline frames of the given web page;
    extracting a set of features of a given inline frame from a given one of the identified frame tags in the given web page, the extracted set of features comprising one or more style features, one or more destination features and one or more context features of the given identified frame tag;
    classifying the given inline frame as one of a malicious frame type and a benign frame type utilizing at least one model and at least a portion of the extracted set of features;
    assigning a priority value to the given inline frame responsive to classifying the given inline frame as the malicious frame type, the priority value assigned to the given inline frame being based at least in part on (i) one or more scores produced by the at least one model, and (ii) one or more characteristics of a cluster of web pages containing the given inline frame; and
    controlling access by one or more client devices associated with an enterprise to the given web page, responsive to classifying the given inline frame as the malicious frame type, based at least in part on the priority value assigned to the given inline frame;
    wherein extracting the one or more style features comprises parsing a style attribute of the given identified frame tag to generate at least one of the one or more style features associated with display of the given inline frame;

wherein extracting the one or more destination features comprises parsing a uniform resource locator (URL) value from a source attribute of the given inline frame to generate at least one of the one or more destination features associated with construction of the URL value; and wherein the method is performed by at least one processing device comprising a processor coupled to a memory.

2. The method of claim 1 wherein obtaining the given web page comprises utilizing a static web crawler configured to download the given web page without execution.

3. The method of claim 1 wherein said at least one of the one or more style features associated with the display of the given inline frame comprises one or more features associated with a positioning of the given inline frame.

4. The method of claim 1 wherein said at least one of the one or more style features associated with the display of the given inline frame comprises one or more features associated with visibility of the given inline frame.

5. The method of claim 1 wherein said at least one of the one or more destination features associated with the construction of the URL value comprises one or more features associated with a subdomain and top level domain of the URL value.

6. The method of claim 1 wherein said at least one of the one or more destination features associated with the construction of the URL value comprises one or more features associated with query parameters and fragments of the URL value.

7. The method of claim 1 wherein said at least one of the one or more destination features associated with the construction of the URL value comprises one or more features associated with at least one of a length and respective counts of digits and letters in one or more portions of the URL value.

8. The method of claim 1 wherein extracting the context features comprises parsing one or more hypertext markup language (HTML) tags of the given web page to generate at least one of the one or more context features associated with context of the given inline frame in the given web page.

9. The method of claim 8 wherein said at least one of the one or more context features associated with the context of the given inline frame in the given web page comprises one or more features associated with a distance of the given identified frame tag relative to at least one of a Domain Object Model (DOM) tree of the given web page, a starting HTML tag of the given web page, an ending HTML tag of the given web page, a body tag of the given web page, and a head tag of the given web page.

10. The method of claim 8 wherein said at least one of the one or more context features associated with the context of the given inline frame in the given web page comprises one or more features associated with respective numbers of HTML, body and head tags in the given web page.

11. The method of claim 8 wherein said at least one of the one or more context features associated with the context of the given inline frame in the given web page comprises one or more features associated with a web template utilized by the given web page.

12. The method of claim 1 wherein the at least one model comprises a machine learning model trained using a training data set comprising a plurality of benign frame tags and a plurality of malicious frame tags, the machine learning model comprising one of a random forest model, a k-nearest neighbor model, a support vector machine model, and a decision tree model.

13. The method of claim 1 wherein controlling access by the one or more client devices comprises modifying access by a given one of the client devices to the given web page, wherein modifying access by the given client device to the given web page comprises at least one of:

preventing the given client device from accessing the given web page; and causing the given web page to be opened in a sandboxed application environment on the given client device.

14. A method comprising:

obtaining a given web page;

parsing the given web page to identify one or more frame tags for one or more inline frames of the given web page;

extracting a set of features of a given inline frame from a given one of the identified frame tags in the given web page, the extracted set of features comprising one or more style features, one or more destination features and one or more context features of the given identified frame tag;

classifying the given inline frame as one of a malicious frame type and a benign frame type utilizing at least one model and at least a portion of the extracted set of features;

assigning a priority value to the given inline frame responsive to classifying the given inline frame as the malicious frame type, the priority value assigned to the given inline frame being based at least in part on (i) one or more scores produced by the at least one model, and (ii) one or more characteristics of a cluster of web pages containing the given inline frame; and controlling access by one or more client devices associated with an enterprise to the given web page, responsive to classifying the given inline frame as the malicious frame type, based at least in part on the priority value assigned to the given inline frame;

wherein extracting the one or more context features comprises parsing one or more hypertext markup language (HTML) tags of the given web page to generate at least one of the one or more context features associated with context of the given inline frame in the given web page;

wherein said at least one of the one or more context features associated with the context of the given inline frame in the given web page comprises one or more features associated with a domain of the uniform resource locator (URL) value of the given inline frame relative to a domain of the given web page; and wherein the method is performed by at least one processing device comprising a processor coupled to a memory.

15. A computer program product comprising a non-transitory processor-readable storage medium having stored therein program code of one or more software programs, wherein the program code when executed by at least one processing device cause the at least one processing device:

to obtain a given web page;

to parse the given web page to identify one or more frame tags for one or more inline frames of the given web page;

to extract a set of features of a given inline frame from a given one of the identified frame tags in the given web page, the extracted set of features comprising one or more style features, one or more destination features and one or more context features of the given identified frame tag;

to classify the given inline frame as one of a malicious frame type and a benign frame type utilizing at least one model and at least a portion of the extracted set of features;

to assign a priority value to the given inline frame responsive to classifying the given inline frame as the malicious frame type, the priority value assigned to the given inline frame being based at least in part on (i) one or more scores produced by the at least one model, and (ii) one or more characteristics of a cluster of web pages containing the given inline frame; and to control access by one or more client devices associated with an enterprise to the given web page, responsive to classifying the given inline frame as the malicious frame type, based at least in part on the priority value assigned to the given inline frame;

wherein extracting the one or more style features comprises parsing a style attribute of the given identified frame tag to generate at least one of the one or more style features associated with display of the given inline frame; and wherein extracting the one or more destination features comprises parsing a uniform resource locator (URL) value from a source attribute of the given inline frame to generate at least one of the one or more destination features associated with construction of the URL value.

16. The computer program product of claim 15 wherein extracting the one or more context features comprises parsing one or more hypertext markup language (HTML) tags of the given web page to generate at least one of the one or more context features associated with context of the given inline frame in the given web page.

17. The computer program product of claim 15 wherein said at least one of the one or more context features associated with the context of the given inline frame in the given web page comprises one or more features associated with a domain of the URL value of the given inline frame relative to a domain of the given web page.

18. An apparatus comprising:

at least one processing device comprising a processor coupled to a memory;

the at least one processing device being configured:

to obtain a given web page;

to parse the given web page to identify one or more frame tags for one or more inline frames of the given web page;

to extract a set of features of a given inline frame from a given one of the identified frame tags in the given web page, the extracted set of features comprising one or more style features, one or more destination features and one or more context features of the given identified frame tag;

to classify the given inline frame as one of a malicious frame type and a benign frame type utilizing at least one model and at least a portion of the extracted set of features;

to assign a priority value to the given inline frame responsive to classifying the given inline frame as the malicious frame type, the priority value assigned to the given inline frame being based at least in part on (i) one or more scores produced by the at least one model, and (ii) one or more characteristics of a cluster of web pages containing the given inline frame; and to control access by one or more client devices associated with an enterprise to the given web page, responsive to classifying the given inline frame as the malicious frame type, based at least in part on the priority value assigned to the given inline frame;

wherein extracting the one or more style features comprises parsing a style attribute of the given identified frame tag to generate at least one of the one or more style features associated with display of the given inline frame; and wherein extracting the one or more destination features comprises parsing a uniform resource locator (URL) value from a source attribute of the given inline frame to generate at least one of the one or more destination features associated with construction of the URL value.

19. The apparatus of claim 18 wherein extracting the one or more context features comprises parsing one or more hypertext markup language (HTML) tags of the given web page to generate at least one of the one or more context features associated with context of the given inline frame in the given web page.

20. The apparatus of claim 19 wherein said at least one of the one or more context features associated with the context of the given inline frame in the given web page comprises one or more features associated with a domain of the URL value of the given inline frame relative to a domain of the given web page.

* * * * *